US012647909B2

(12) United States Patent
Moon

(10) Patent No.: US 12,647,909 B2
(45) Date of Patent: Jun. 2, 2026

(54) METHOD AND APPARATUS FOR SUPPORTING CLOCK SYNCHRONIZATION OF USER EQUIPMENT IN WIRELESS COMMUNICATION SYSTEM

(71) Applicant: Samsung Electronics Co., Ltd., Suwon-si (KR)

(72) Inventor: Sangjun Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 599 days.

(21) Appl. No.: 17/712,409

(22) Filed: Apr. 4, 2022

(65) Prior Publication Data

US 2022/0322257 A1 Oct. 6, 2022

(30) Foreign Application Priority Data

Apr. 5, 2021 (KR) ........................ 10-2021-0044304

(51) Int. Cl.
*H04W 56/00* (2009.01)
*H04J 3/06* (2006.01)
*H04W 92/10* (2009.01)

(52) U.S. Cl.
CPC ......... *H04W 56/001* (2013.01); *H04J 3/0661* (2013.01); *H04W 92/10* (2013.01)

(58) Field of Classification Search
None
See application file for complete search history.

(56) References Cited

U.S. PATENT DOCUMENTS

| | | | |
|---|---|---|---|
| 2012/0044854 A1 | 2/2012 | Chen et al. | |
| 2020/0329397 A1 | 10/2020 | Huang-Fu | |
| 2020/0351804 A1 | 11/2020 | Moon et al. | |
| 2022/0021624 A1* | 1/2022 | Sachs | ...................... H04L 47/28 |
| 2022/0030460 A1* | 1/2022 | Wang | ............... H04W 28/0268 |
| 2022/0210755 A1 | 6/2022 | Xiong | |

(Continued)

FOREIGN PATENT DOCUMENTS

| | | |
|---|---|---|
| CN | 111525973 A | 8/2020 |
| EP | 4 009 563 A1 | 6/2022 |
| WO | 2020/167013 A1 | 8/2020 |

(Continued)

OTHER PUBLICATIONS

International Search Report dated Jul. 7, 2022, issued in an International Application No. PCT/KR2022/004799.

(Continued)

*Primary Examiner* — Ayman A Abaza
*Assistant Examiner* — Hooman Houshmand
(74) *Attorney, Agent, or Firm* — Jefferson IP Law, LLP

(57) ABSTRACT

An operating method of a base station supporting time synchronization of a terminal in a wireless communication system is provided. The operating method includes obtaining, with respect to the terminal connected to the base station, a synchronization indicator indicating whether the terminal requests time synchronization, obtaining, from an application function (AF) or a network exposure function (NEF), a synchronization accuracy required for the time synchronization of the terminal, and activating or deactivating a time synchronization function, based on the synchronization indicator and the synchronization accuracy.

12 Claims, 13 Drawing Sheets

(56)  References Cited

U.S. PATENT DOCUMENTS

2022/0264490 A1 *   8/2022   Sha ..................... H04W 56/001

FOREIGN PATENT DOCUMENTS

WO          2021/023156  A1     2/2021
WO          2021/057547  A1     4/2021

OTHER PUBLICATIONS

3GPP TS 23.502 V17.0.0; 3rd Generation Partnership Project; Technical Specification Group Services and System Aspects; Procedures for the 5G System (5GS); Stage 2, (Release 17), Mar. 31, 2021.
3GPP TS 23.501 V17.0.0; 3rd Generation Partnership Project; Technical Specification Group Services and System Aspects; System architecture for the 5G System (5GS); Stage 2, (Release 17), Mar. 30, 2021.
CATT; KI #3B, New Sol: Activate or deactivate TSN time synchronization per AF request; 3GPP TSG-WG SA2 Meeting #139E; S2-2003920 Elbonia, (revision of S2-200xxxx), May 22, 2020.
CATT, KI #3B, New Sol: Activate or deactivate TSN time synchronization per AF request, 3GPP Draft, S2-2003920, 3GPP TSG-WG SA2 Meeting #139E, May 22, 2020, XP051889928.
Extended European Search Report dated Jun. 3, 2024, issued in European Patent Application No. 22784889.2.
European Office Action dated Apr. 9, 2026, issued in European Patent Application No. 22784889.2.

* cited by examiner

FIG. 2

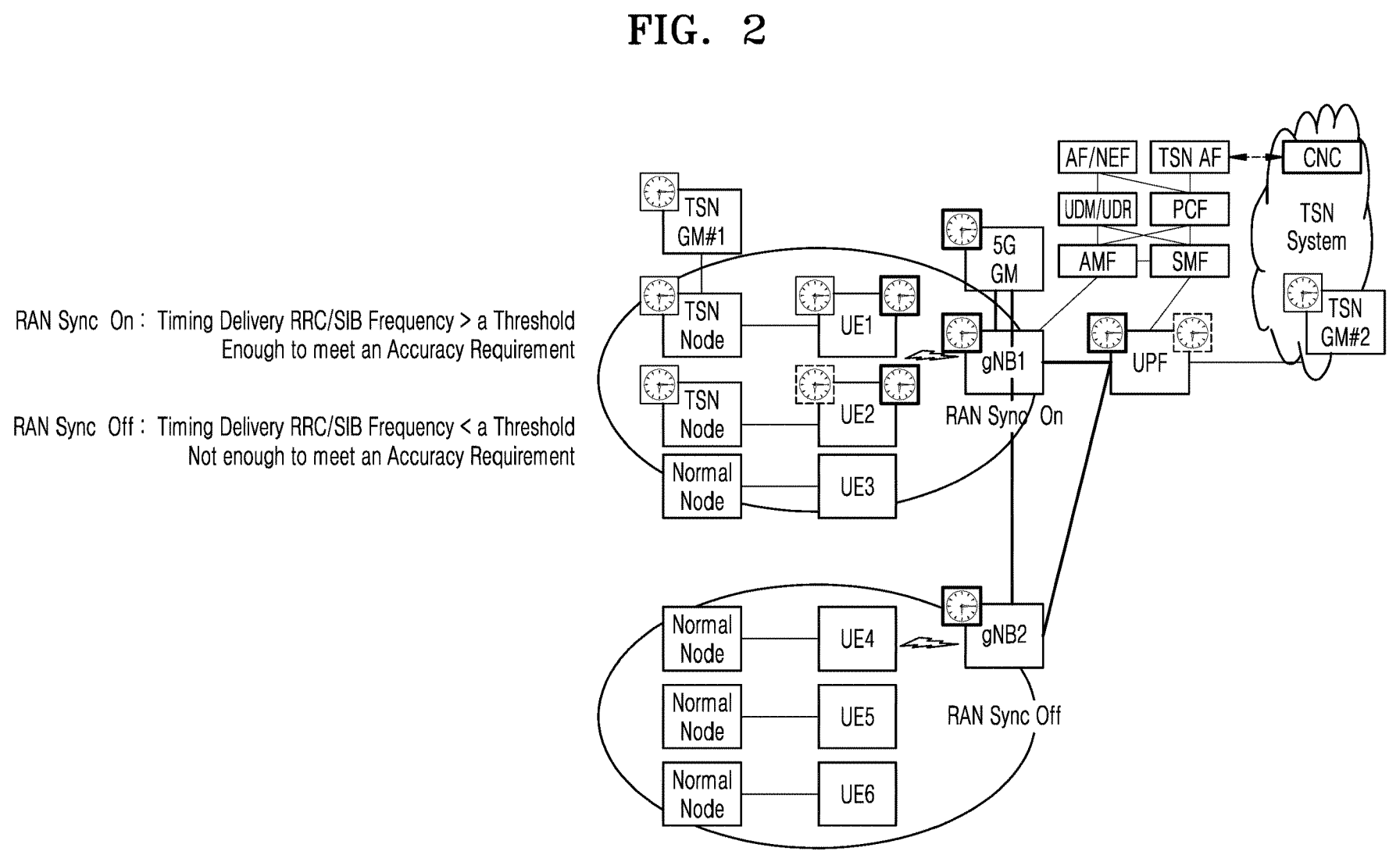

RAN Sync On : Timing Delivery RRC/SIB Frequency > a Threshold
Enough to meet an Accuracy Requirement RAN Sync Off : Timing Delivery RRC/SIB Frequency < a Threshold
Not enough to meet an Accuracy Requirement

METHOD AND APPARATUS FOR SUPPORTING CLOCK SYNCHRONIZATION OF USER EQUIPMENT IN WIRELESS COMMUNICATION SYSTEM

CROSS-REFERENCE TO RELATED APPLICATION(S)

This application is based on and claims priority under 35 U.S.C. § 119 (a) of a Korean patent application number 10-2021-0044304, filed on Apr. 5, 2021, in the Korean Intellectual Property Office, the disclosure of which is incorporated by reference herein in its entirety.

BACKGROUND

1. Field

The disclosure relates to a method and apparatus for supporting clock synchronization of a user equipment (UE) in a wireless communication system. More particularly, the disclosure relates to a technology to send a synchronization requirement of the user equipment to a network when providing visual synchronization between user equipments in $3^{rd}$ generation partnership project (3GPP) 5th generation system (5GS).

2. Description of Related Art

To meet the ever-increasing demand with respect to wireless data traffic since the commercialization of the 4th generation (4G) communication system, there have been efforts to develop an advanced 5th generation (5G) system or pre-5G communication system. For this reason, the 5G or pre-5G communication system is also called a beyond 4th-generation (4G) network communication system or post long term evolution (post LTE) system.

Implementation of the 5G communication system using ultrahigh frequency (millimeter wave (mmWave)) bands, e.g., 60 giga hertz (GHz) bands, is being considered to attain higher data transfer rates. To reduce propagation loss of radio waves and increase a transmission range of radio waves in the ultrahigh frequency bands, beamforming, massive multiple-input multiple-output (MIMO), full dimensional MIMO (FD-MIMO), array antenna, analog beamforming, and large-scale antenna techniques are under discussion.

To improve system networks, technologies for advanced small cells, cloud radio access networks (RANs), ultra-dense networks, device to device (D2D) communication, wireless backhaul, moving networks, cooperative communication, coordinated multi-points (COMP), reception-end interference cancellation and the like are also being developed in the 5G communication system.

In addition, in the 5G system, an advanced coding modulation (ACM), e.g., hybrid frequency shift keying (FSK) and quadrature amplitude modulation (QAM) (FQAM), sliding window superposition coding (SWSC), and an advanced access technology, e.g., filter bank multi carrier (FBMC), non-orthogonal multiple access (NOMA), and sparse code multiple access (SCMA) are being developed.

The 5G system is considering support for various services in contrast to the existing 4G system. For example, the most representative services may include an enhanced mobile broad band (eMBB) communication service, an ultra-reliable and low latency communication (URLLC) service, a massive machine type communication (mMTC) service, an evolved multimedia broadcast/multicast service (eMBMS), etc. A system for providing the URLLC service may be referred to as a URLLC system, and a system for providing the eMBB communication service may be referred to as an eMBB system. The terms 'service' and 'system' may be interchangeably used.

Among them, the URLLC service is considered not in the existing 4G system but newly in the 5G system, and required to satisfy ultra-high reliability, e.g., a packet error rate of 10-5, and low latency, e.g., about 0.5 msec, as compared to the other services. To meet such stringent requirements of the URLLC service, a shorter transmission time interval (TTI) than in the eMBB service may need to be applied, and various operation schemes that use the short TTI are being considered.

In the meantime, the Internet is evolving from a human-oriented connectivity network where humans generate and consume information to an Internet of things (IoT) network where distributed entities or things send, receive and process information without human intervention. Internet of Everything (IoE) technologies, in which a big data processing technology through connection with a cloud server, for example, are combined with an IoT technology, have also emerged. To implement IoT, various technologies, such as a sensing technology, a wired/wireless communication and network infrastructure, a service interfacing technology, and a security technology are required, and even technologies for sensor networks, machine to machine (M2M) communication, machine type communication (MTC) for connection between things are being studied these days.

In the IoT environment, intelligent Internet technology (IT) services that create new values for human life by collecting and analyzing data generated from connected things may be provided. IoT may be applied to a variety of areas, such as smart homes, smart buildings, smart cities, smart cars or connected cars, smart grids, health care, smart home appliances and advanced medical services through convergence and combination between existing information technologies (IT) and various industrial applications.

In this regard, various attempts to apply the 5G communication system to the IoT network are being made. For example, technologies regarding sensor network, M2M, MTC, etc., are implemented by the 5G communication technologies, such as beamforming, MIMO, array antenna schemes, etc. Even application of a cloud radio access network (cloud RAN) as the aforementioned big data processing technology may be an example of convergence of 5G and IoT technologies.

As various services may be provided with the advancement of wireless communication systems, a scheme for delivering a request for synchronization of a user equipment is required in particular when providing clock synchronization between user equipments in a wireless communication system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus, by which a user equipment (UE) connected to a 3rd generation partnership project (3GPP) network transmits to the network a requirement for supporting time sensitive networking (TSN) synchronization, enabling the radio access network (RAN) to control a sync information transfer period and method according to the requirement.

Additional aspects will be set forth in part in the description which follows and, in part, will be apparent from the description, or may be learned by practice of the presented embodiments.

In accordance with an aspect of the disclosure, an operating method of a base station supporting time synchronization of a terminal in a wireless communication system is provided. The operating method includes obtaining, with respect to the terminal connected to the base station, a synchronization indicator indicating whether the terminal requests time synchronization, obtaining, from an application function (AF) or a network exposure function (NEF), a synchronization accuracy required for the time synchronization of the terminal, and activating or deactivating a time synchronization function, based on the synchronization indicator and the synchronization accuracy.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 is a diagram for describing an increase in efficiency of a radio access network (RAN) by turning on or off a RAN sync function according to an embodiment of the disclosure;

FIG. 5B is a diagram for illustrating a procedure for controlling a RAN sync function for a PDU session already set up according to an embodiment of the disclosure;

FIG. 6B is a diagram for illustrating a procedure for controlling a RAN sync function and delivering a PMIC for a PDU session having a PMIC delivery path already completed according to an embodiment of the disclosure;

FIG. 7B is a diagram for illustrating a procedure for QoS modification and a procedure for deactivating a RAN sync function when a PDU session is released or when a UE is deregistered according to an embodiment of the disclosure.

The same reference numerals are used to represent the same elements throughout the drawings.

DETAILED DESCRIPTION

Figure 1:
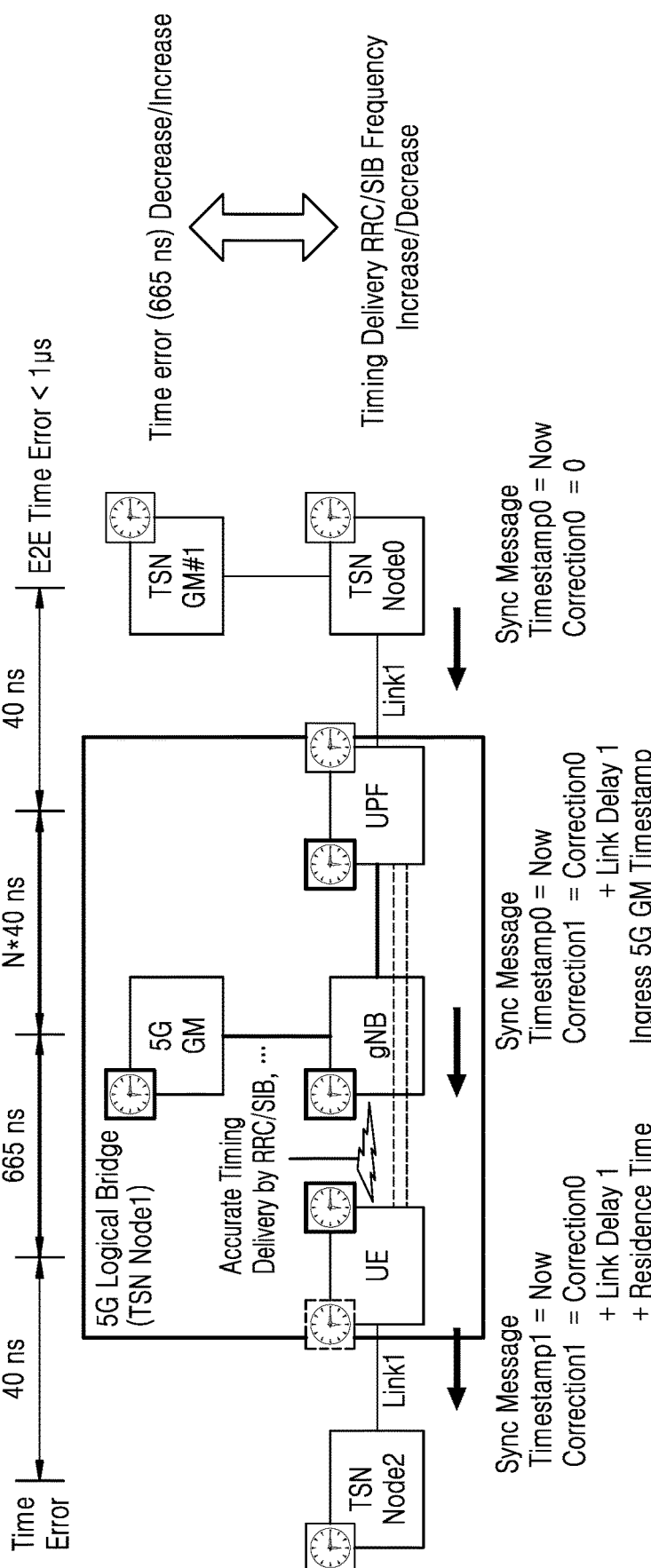
FIG. 1 is a conceptual diagram of a time sensitive networking (TSN) synchronization supporting procedure over a 3rd generation partnership project (3GPP) network, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Advantages and features of the disclosure, and methods for attaining them will be understood more clearly with reference to the following embodiments of the disclosure, which will be described in detail later along with the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers refer to like elements throughout the specification.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

It will be understood that each block and combination of the blocks of a flowchart may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in some alternative embodiments. For example, two successive blocks may be performed substantially at the same time or in reverse order depending on the corresponding functions.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a higher number of components and modules. Moreover, the components and modules may be implemented to execute one or more central processing units (CPUs) in a device or security multimedia card. In embodiments of the disclosure, the module may include one or more processors. Herein, the terms to identify access nodes, the terms to refer to network entities, the terms to refer to messages, the terms to refer to interfaces among network entities, the terms to refer to various types of identification information, etc., are examples for convenience of explanation. Accordingly, the disclosure is not limited to the terms as herein used, and may use different terms to refer to the items having the same meaning in a technological sense.

In the following description, for convenience of explanation, terms and definitions used in the most recent standards among the existing communication standards, i.e., in the 5GS and NR standard defined in the 3rd Generation Partnership Project (3GPP), will be used. The disclosure is not, however, limited to these terms and definitions, and may equally apply to any radio communication networks that conform to other standards.

In the disclosure, eNode B (eNB) may be interchangeably used with gNode B (gNB). For example, a base station referred to as an eNB may also indicate a gNB. Furthermore, the term 'terminal' or 'user equipment (UE)' may refer not only to a cell phone, an NB-IoT device, and a sensor but also to other wireless communication devices.

In the following description, a base station is an entity for performing resource allocation for a terminal, and may be at least one of a gNB, an eNB, a Node B, a base station (BS), a radio access unit, a base station controller, or a node on a network. The terminal may include a UE, a mobile station (MS), a cellular phone, a smart phone, a computer, or a multimedia system capable of performing a communication function. It is, of course, not limited thereto.

Especially, the disclosure may be applied to the 3GPP 5GS/NR (which is the 5G mobile communication standard). The disclosure may be applied to intelligent services based on the 5G communication and IoT related technologies, e.g., smart homes, smart buildings, smart cities, smart cars, connected cars, health care, digital education, smart retail, and security and safety services. In the disclosure, eNode B (eNB) may be interchangeably used with gNode B (gNB). For example, a base station referred to as an eNB may also indicate a gNB. Furthermore, the term 'terminal' or 'user equipment (UE)' may refer not only to a cell phone, an NB-IoT device, and a sensor but also to other wireless communication devices.

Wireless communication systems are evolving from early systems that provide voice-oriented services to broadband wireless communication systems that provide high data rate and high quality packet data services such as 3GPP high speed packet access (HSPA), long term evolution (LTE) or evolved universal terrestrial radio access (E-UTRA), LTE-advanced (LTE-A), LTE-Pro, 3GPP2 high rate packet data (HRPD), ultra-mobile broadband (UMB), and IEEE 802.16e communication standards.

As a representative example of such a broadband wireless communication system, an LTE system adopts orthogonal frequency division multiplexing (OFDM) for a downlink (DL) and single carrier frequency division multiple access (SC-FDMA) for an uplink (UL). The UL refers to a radio link for a UE or MS to send data or a control signal to an eNode B or BS, and the DL refers to a radio link for a BS to send data or a control signal to a UE or MS. Such a multiple-access scheme allocates and operates time-frequency resources for carrying data or control information for respective users not to overlap each other, i.e., to maintain orthogonality, thereby differentiating each user's data or control information.

As a future communication system after the LTE, the 5G communication system needs to freely reflect various demands from users and service providers and thus support services that simultaneously meet the various demands. The services considered for the 5G communication system may include enhanced Mobile Broadband (eMBB), massive Machine Type Communication (mMTC), Ultra Reliability Low Latency Communication (URLLC), etc.

In some embodiments, the aim of the eMBB is to provide more enhanced data rates than the LTE, LTE-A or LTE-Pro may support. For example, in the 5G communication system, the eMBB is required to provide 20 Gbps peak data rate in DL and 10 Gbps peak data rate in UL in terms of a single BS. Furthermore, the 5G communication system may need to provide an increasing user perceived data rate while providing the peak data rate. To satisfy these requirements, enhancement of various technologies for transmission or reception including multiple-input multiple-output (MIMO) transmission technologies may be required in the 5G communication system. While the present LTE uses up to 20 MHz transmission bandwidth in the 2 GHz band for signal transmission, the 5G communication system may use a frequency bandwidth wider than 20 MHz in the 3 to 6 GHz band or in the 6 GHz or higher band, thereby satisfying the data rate required by the 5G communication system.

At the same time, in the 5G communication system, mMTC is considered to support an application service such as an Internet of Things (IoT) application service. In order for the mMTC to provide the IoT efficiently, support for access from massive number of terminals in a cell, enhanced coverage of the terminal, extended battery time, reduction in terminal price, etc., may be required. Because the IoT is equipped in various sensors and devices to provide communication functions, it may be supposed to support a large number of UEs in a cell (e.g., 1,000,000 terminals/km$^2$). Furthermore, a terminal supporting the mMTC is more likely to be located in a shadow area, such as a basement of a building, which might not be covered by a cell due to the nature of the service, so the mMTC may require an even larger coverage than expected for other services provided by the 5G communication system. A terminal supporting the mMTC needs to be a low-cost terminal, and may require quite a long battery life time such as 10 to 15 years because it is difficult to frequently change the battery in the terminal.

Finally, the URLLC may be a mission-critical cellular based wireless communication service, which may be used for services used for remote control over robots or machinery, industrial automation, unmanned aerial vehicle, remote health care, emergency alert, etc. Accordingly, communication offered by the URLLC may require very low latency (ultra low latency) and very high reliability. For example, URLLC services may need to satisfy sub-millisecond (less than 0.5 millisecond) air interface latency and simultaneously require error rates lower than 1 packet loss in $10^5$ packets, i.e., a packet error rate of 10-5. Hence, for the URLLC services, the 5G system needs to provide a smaller transmit time interval (TTI) than for other services, and simultaneously requires a design that allocates a wide range of resources for a frequency band to secure reliability of the communication link.

Those three services considered in the aforementioned 5G communication system, i.e., eMBB, URLLC, and mMTC, may be multiplexed and transmitted from a single system. In this case, to meet different requirements for the three services, different transmission or reception schemes and parameters may be used between the services. The mMTC, URLLC, and eMBB are an example of different types of services, and embodiments of the disclosure are not limited to the service types.

Although the following embodiments of the disclosure will now be focused on an LTE, LTE-A, LTE Pro or 5G (or NR, next generation mobile communication) system for example, they may be equally applied to other communication systems with similar technical backgrounds or channel types. Furthermore, embodiments of the disclosure will also be applied to different communication systems with some modifications to such an extent that they do not significantly deviate from the scope of the disclosure when judged by those of ordinary skill in the art.

TSN is short for time sensitive networking, which is a set of multiple standards related to time synchronization, low latency, associated resource management, and improvement of reliability for supporting e.g., audio/video or factory automation. Methods of supporting the TSN in the 3GPP network has been proposed.

FIG. 1 is a conceptual diagram of a TSN synchronization supporting procedure over a 3GPP network, according to an embodiment of the disclosure.

Referring to FIG. 1, to support time synchronization in wired TSN, each TSN node transmits a sync frame attached with a time stamp based on a TSN grand master (GM) clock. Upon receiving the sync frame, a TSN node reflects a propagation delay of a link that has received the sync frame and residence time, which is a time delay at the TSN node, in a correction field of the sync frame, and transmits the resultant sync frame to a subsequent TSN node. After this procedure, all the TSN nodes may attain time synchronization based on the TSN GM clock.

A method by which the 3GPP network serves as a TSN node has been proposed to support the TSN synchronization even in the 3GPP network. In this proposal, all entities in the 3GPP network need to be synchronized to a 5G GM clock. For this, assume that a RAN is connected to a 3GPP GM clock and a user plane function (UPF) connected to the RAN over a wired network is synchronized to the 5G GM clock by employing the wired TSN synchronization scheme or any other schemes. The RAN and a UE are connected through 5G air protocol, and the RAN needs to provide several additional functions to support precise synchronization (e.g., with a time error of less than 656 ns) with the UE in the connection procedure. The functions include accurate timing delivery by radio resource control (RRC)/system information block (SIB), finer timing advance (TA) Granularity, propagation delay compensation, etc.

A synchronization procedure in a DL will now be described first. While entities in the 3GPP network are all synchronized to the 5G GM clock, when receiving the sync frame, the UPF transmits an ingress time stamp based on the 5G GM clock and a link delay with respect to a previous TSN node, being measured/calculated and managed by the UPF, in the sync frame, and a UE calculates a time to transmit the sync frame to an external TSN node based on the 5G GM clock, calculates a difference between the time for transmission and the ingress time, and completes the TSN synchronization operation by reflecting the difference as a residence time in the correction field. For synchronization in an uplink, a UE transmits an ingress time, which is a 5G GM based time at which the sync frame is received from the previous TSN node, and a link delay with respect to the previous TSN node in the sync frame, and the UPF calculates a time to transmit the sync frame to an external TSN node based on the 5G GM clock, calculates a difference between the time for transmission and the ingress time, and reflect the difference as the residence time in the correction field. With this process, the 3GPP network may keep TSN synchronization within less than 1 micro second (us) of time error.

FIG. 2 is a diagram for describing an increase in efficiency of a RAN by turning on or off a RAN sync function according to an embodiment of the disclosure.

In a case that a UE connected to a RAN (gNB) is able to inform whether it requires TSN synchronization, when there is a UE that requires TSN synchronization in a single cell of the gNB, the RAN may turn on (activate) RAN sync functions such as accurate timing delivery by RRC/SIB, finer TA granularity, propagation delay compensation and the like, or when there is no UE that requires TSN synchronization in the cell of the gNB, the RAN may turn off (deactivate) the RAN sync functions, thereby enabling efficient use of resources.

In an embodiment of the disclosure, for accurate timing delivery, the RAN may send an additional RRC signal and send system information blocks (SIBs) more frequently. In an embodiment of the disclosure, additional RRC signaling may also be required to support finer TA granularity, and more frequent delay compensation processes may be required for finer propagation delay compensation.

Referring to FIG. 2, gNB1 is connected to UE1 that requires uplink TSN synchronization, UE2 that requires downlink TSN synchronization, and UE3 that requires no TSN synchronization. In this case, gNB1 may turn on a function of the RAN to support the TSN synchronization to support the TSN sync requests of UEL and UE2. gNB2 is connected to UE4, UE5, and UE6, none of which requires TSN synchronization. Accordingly, gNB2 turns off the RAN sync function, thereby efficiently operating the resources.

In this case, one hop (from node to node) may be calculated to have about 40 ns of time error when wired TSN is used. It may be assumed that there are N hops between the gNB and the UPF, where N is small enough to satisfy the time error requirement.

In an embodiment of the disclosure, RAN synchronization may be turned on or off by considering a particular synchronization accuracy requirement. For example, for UE4, UE5, and UE 6, the RAN sync function may be turned off for the accuracy requirement of 1 us but may be turned on for the accuracy requirement of 100 us.

Figure 3:
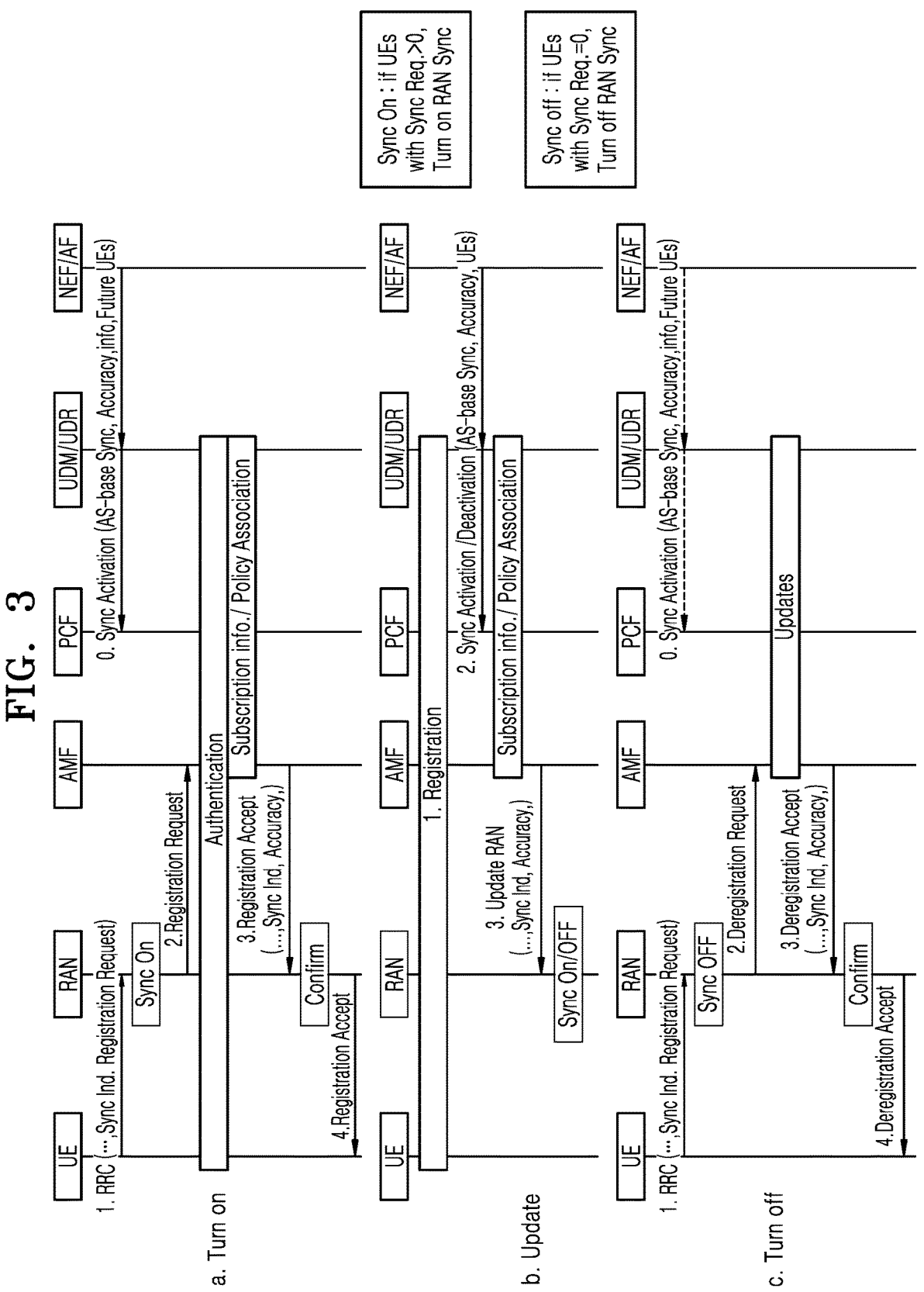
FIG. 3 is a diagram for illustrating a procedure for controlling a RAN sync function by using a RAN parameter in a user equipment (UE) registration process according to an embodiment of the disclosure.

FIG. 3 is a diagram for illustrating a procedure for controlling a RAN sync function by using a RAN parameter in a UE registration process in method proposal 1-1 according to an embodiment of the disclosure.

Referring to FIG. 3, in the 3GPP 5G network configured as shown in FIG. 2, a sync activation request for a UE not yet registered may be sent by external application function (AF) or network exposure function (NEF) to the 5GS, the request including a sync accuracy requirement, in operation a.0. Content of the sync activation request may be recorded in user data repository (UDR).

In operation a.1, when a UE performs registration, the UE may send information about whether the UE requests TSN synchronization in a RAN parameter called sync indication. Upon receiving the information, the RAN may identify that the UE requesting the TNS sync function is in the corresponding cell and turn on the RAN sync function.

In operation a.2, the RAN may send a registration request message to access and mobility management function (AMF), which may in turn perform a registration process such as authentication and identification of subscriber information. In this case, the AMF may select policy control function (PCF), and the PCF may identify connection with a service required and stored in the UDR. The PCF may form association with the AF/NEF. The PCF may identify an accuracy requirement of RAN synchronization requirement for the corresponding UE through information received form UDR or information received from the AF/NEF with which association is newly formed, and send the identified accuracy to the AMF.

In operation a.3, the AMF may send the RAN a registration accept message along with the accuracy requirement. In this case, the RAN may determine whether there is an issue in satisfying the sync accuracy requirement after confirming that the registration is not rejected but accepted. Or, the RAN may be in preparation for the accuracy (e.g., 1 us) for TSN in the previous sync on operation, and may perform the sync on operation to suit the accuracy requirement actually required in the confirmation operation. After this, the RAN may send a registration accept message to the UE in operation a.4.

For a UE already registered in operation b.1, a sync activation/deactivation request including a sync accuracy requirement may be sent by the AF or NEF to the 5GS in operation b.2. The request may be sent through connection between the established PCF and the AF/NEF, and the PCF may send content of the request to the AMF with which association is previously formed. In this case, the AF/NEF may store this request in the UDR.

In operation b.3, the AMF may send the sync activation/deactivation request including the sync accuracy requirement to the RAN. The RAN may turn on or off the RAN sync function to support the sync accuracy requirement. Specifically, when there are one or more UEs supporting synchronization in the corresponding cell after the RAN activates or deactivates synchronization for the corresponding UE, the RAN may increase the RRC/SIB transfer frequency for time information delivery as much as to satisfy the accuracy (RAN sync on). When there is no UE supporting synchronization in the corresponding cell after the RAN activates or deactivates the sync function for the corresponding UE, the RAN may decrease the RRC/SIB transfer frequency for time information delivery as much as not to satisfy the accuracy (RAN sync off).

When the RAN sync activation request including the sync accuracy requirement is reflected by the 5GS in operation c.0, the UE may send information about whether the UE requests TSN synchronization in a RAN parameter called sync indication in operation c.1 when the UE performs deregistration. Upon receiving the information, the RAN may manage the UE by changing the state of the UE into a state of not requesting the TSN sync function, determine whether there is a UE requesting the TSN sync function in the corresponding cell, and turn off (deactivate) the RAN sync function when there is no UE requesting the TNS sync in the cell of the corresponding gNB, thereby enabling efficient use of resources.

After this, the RAN may send a deregistration request message to the AMF in operation c.2. After going through a deregistration process, the AMF may send a deregistration accept message to the RAN in operation c.3. In this case, the RAN may re-confirm whether there is an issue in the RAN sync off process previously performed. Or, the RAN may be in a ready state in the previous sync off operation and may actually perform sync off in the confirmation operation. After this, the RAN may send the deregistration accept message to the UE in operation c.4.

The deregistration process may be triggered by the UE or the network. In any case, when the deregistration for the UE is performed, the RAN may manage the UE by changing the state of the UE into a state of not requesting the TSN sync function, and then turn off (deactivate) the RAN sync function when there is no UE requesting the TNS sync in the cell of the corresponding gNB, thereby enabling efficient use of resources.

Figure 4:
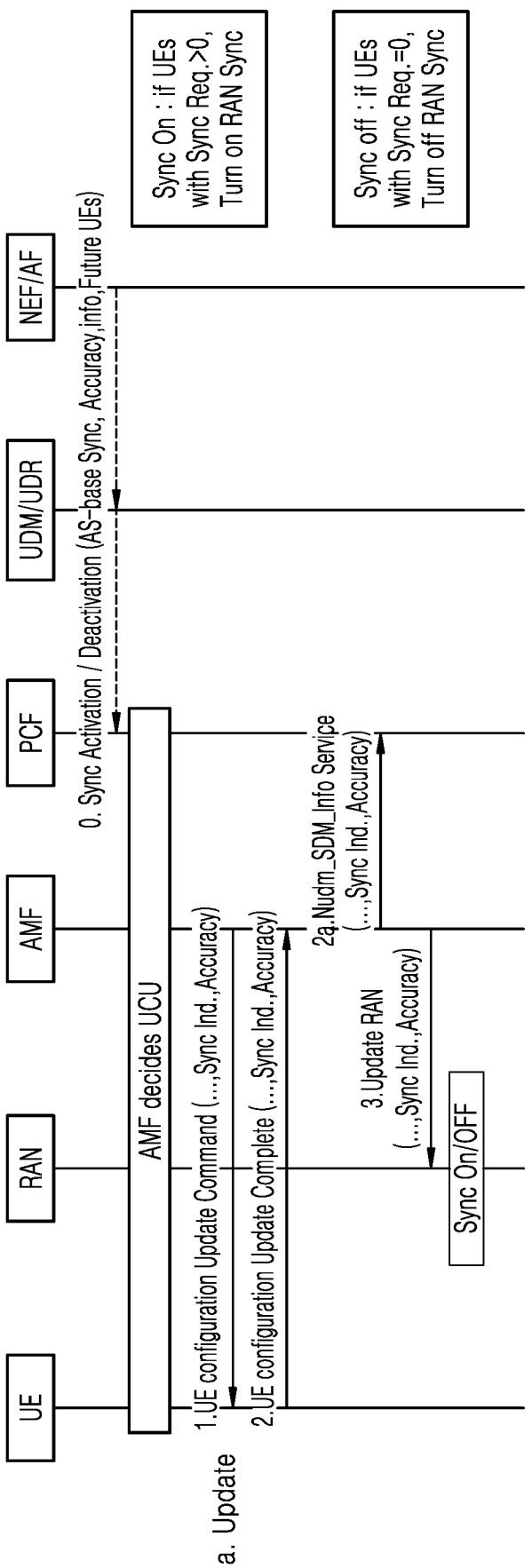
FIG. 4 is a diagram for illustrating a procedure for controlling a RAN sync function by using UE configuration update according to an embodiment of the disclosure.

FIG. 4 is a diagram for illustrating a procedure for controlling a RAN sync function by using UE configuration update (UCU) in method proposal 1-2 according to an embodiment of the disclosure.

Referring to FIG. 4, in the 3GPP 5G network configured as shown in FIG. 2, when the UE performs registration, a sync activation or deactivation request for a UE already registered may be sent from external AF or NEF to the 5GS, the request including a sync accuracy requirement, in operation a.0. The AF/NEF may send content of the request through an existing authorized PCF session, and the PCF may forward the content of the request to the AMF. In this case, the AF/NEF may store the content in UDR/AMF.

When the AMF determines to process the content with the UCU, the AMF may send the sync accuracy to the UE through a UE configuration update command in operation a.1. The UE may inform the AMF that the UE has been configured with the requested sync accuracy in a UE configuration update complete message in operation a.2. The AMF may update what is configured for the UDM in operation a.2a. Subsequently, the AMF forwards the sync accuracy requirement to the RAN in operation a.3. The RAN turns on or off the RAN sync function to support the sync accuracy requirement.

Figure 5A:
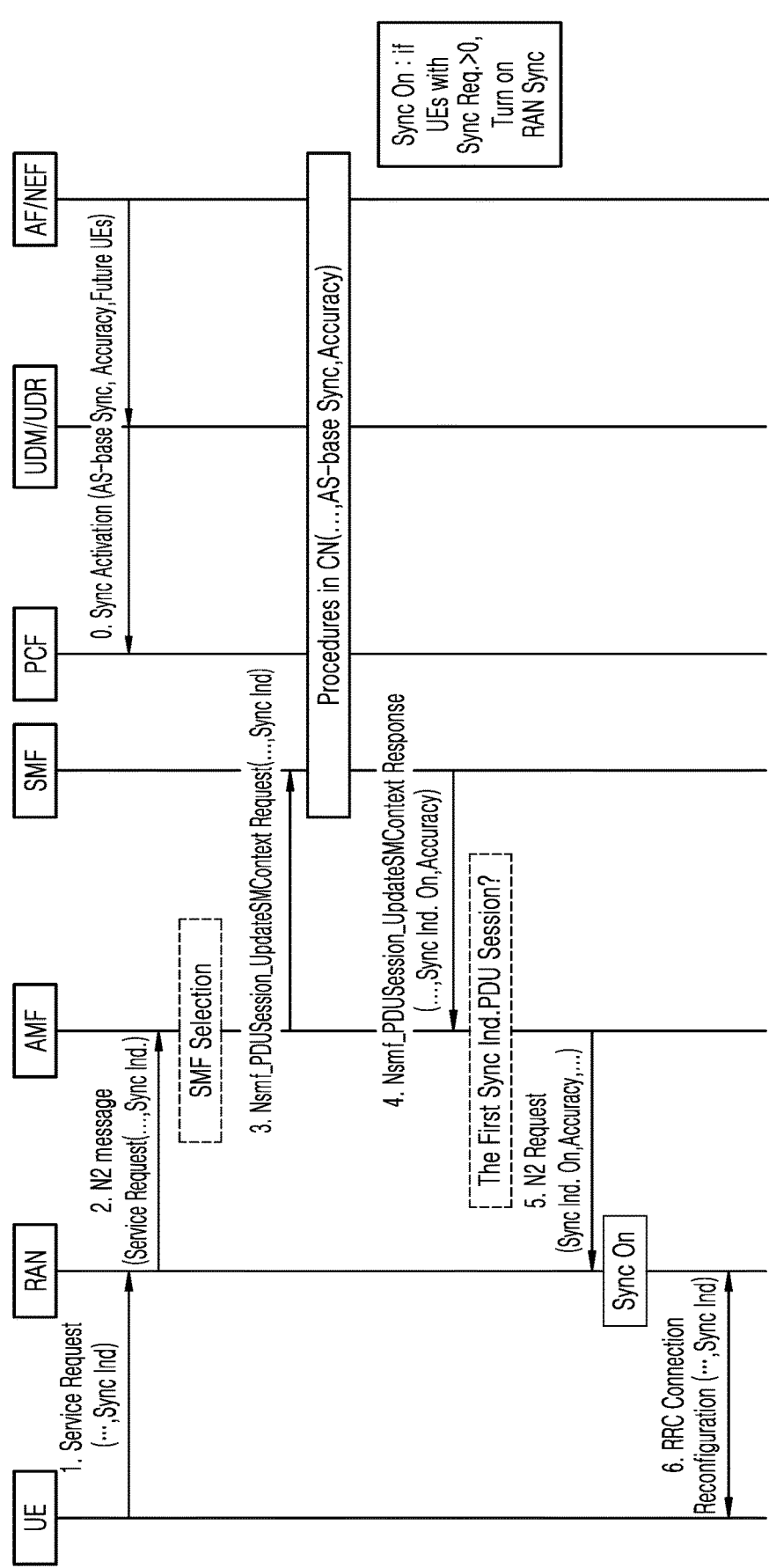
FIG. 5A is a diagram for illustrating a procedure for controlling a RAN sync function in protocol data unit (PDU) session establishment according to an embodiment of the disclosure.
Figure 5B:
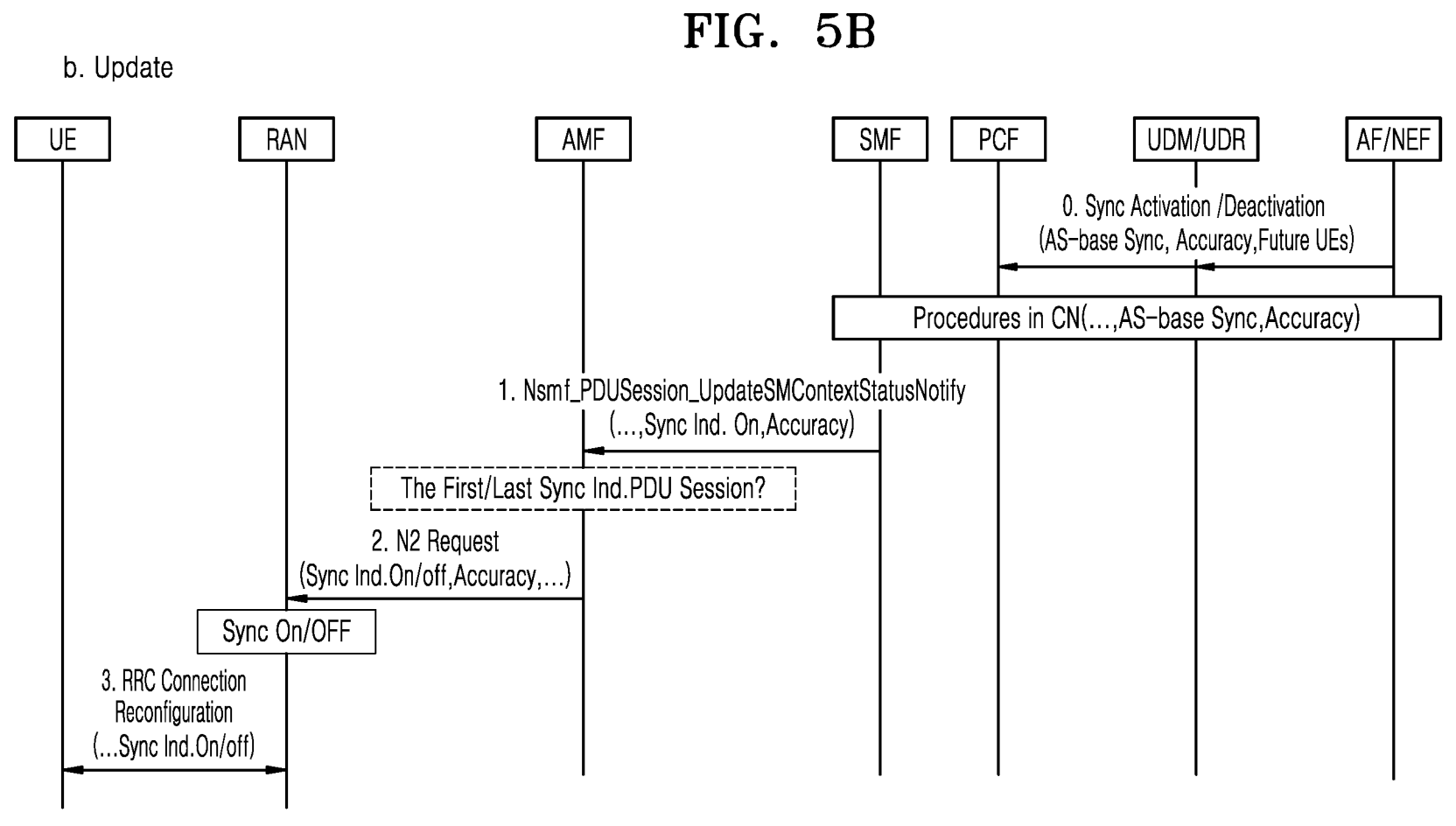
Figure 5C:
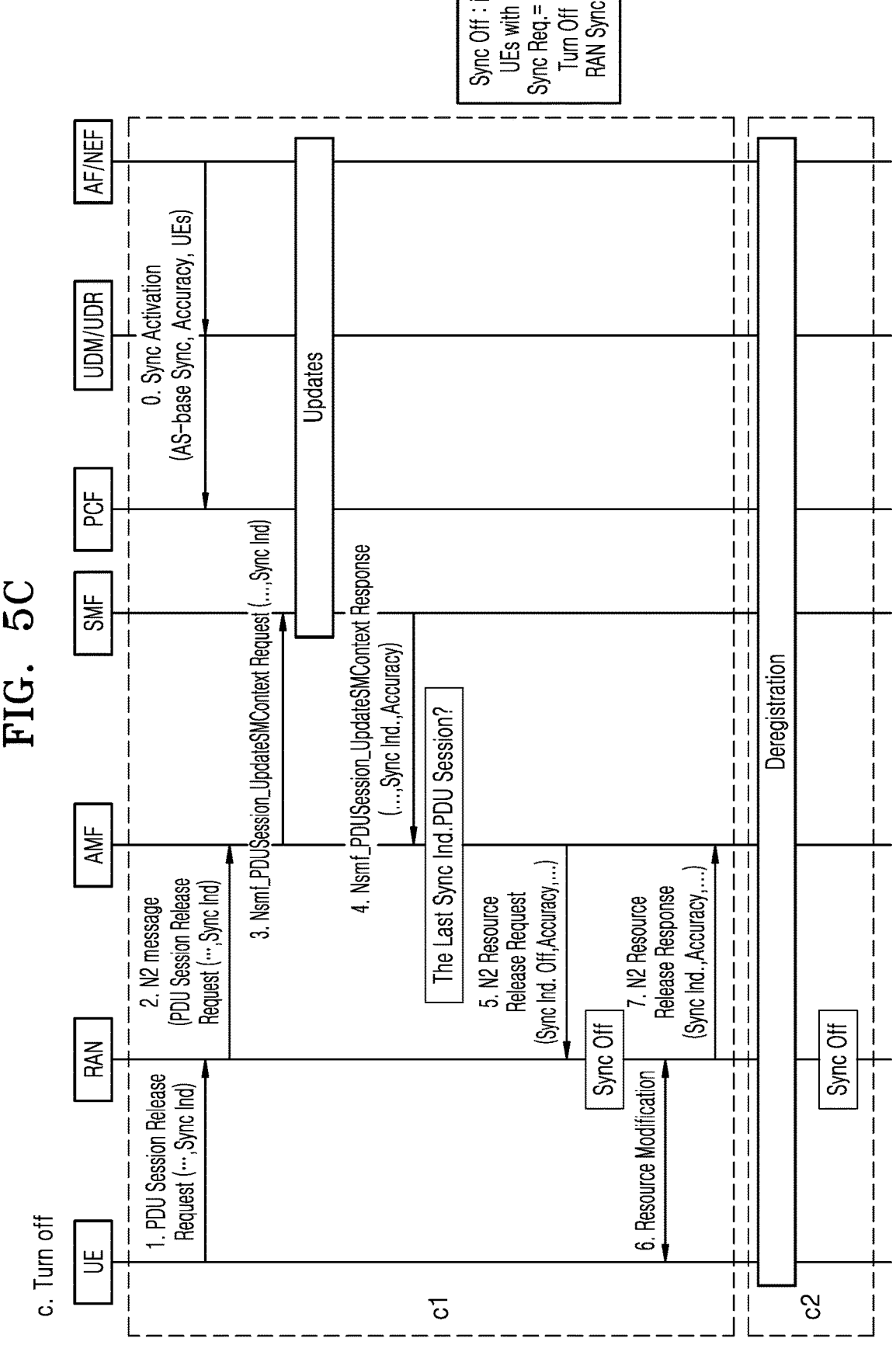
FIG. 5C is a diagram for illustrating a procedure for controlling a RAN sync function in PDU session release or UE deregistration according to an embodiment of the disclosure.

FIGS. 5A, 5B, and 5C are diagrams for illustrating a procedure for controlling a RAN sync function in a PDU session setup/modification procedure in method proposal 2-1 according to various embodiments of the disclosure.

Referring to FIG. 5A, in the 3GPP 5G network configured as shown in FIG. 2, when the UE performs PDU session establishment, a RAN sync activation request for the UE may be sent to the 5GS through the AF or NEF, in operation a.0. The AF/NEF may store the content of the request in the UDR.

In operation a.1, the UE may send a PDU session establishment request message of a service request with sync indication contained therein to the RAN. In operation a.2, the RAN may send the service request to the AMF in an N2 message.

The AMF may in turn forward the received service request to SMF, in which case the AMF may select the SMF that supports the TSN sync function. In operation a.3, the AMF may send a PDU session setup/modification request including the sync indication to the SMF in a Nsmf_P-DUSession_UpdateSMContext request message.

Upon receiving the PDU session setup/modification request message, the SMF may perform a procedure required for PDU session setup/modification, which may include a process of confirming whether the UE has authority to create a PDU session having the TSN sync function. Furthermore, the SMF forms association with PCF, and in this process, the PCF sets up a session required with AF/NEF based on information recorded in the UDR. The PCF may receive all sync activation request information from the UDR, or may receive a corresponding sync activation request from the AF/NEF with which association is newly formed. Subsequently, the PCF may forward the sync activation request to the SMF with which association is formed.

In operation a.4, the SMF may send the AMF a Nsmf_P-DUSession_UpdateSMContext response to ask to send the sync indication and accuracy requirement to the RAN and ask to send a response to the PDU session establishment request to the UE.

In an embodiment of the disclosure, the AMF may determine whether a PDU session establishment response to be sent is for the first sync on PDU session of the UE, and send the RAN the sync indication and accuracy requirement when it is determined that it is the first sync on PDU session. The AMF may send the sync indication and accuracy requirement to the RAN in an N2 request message, in operation a.5. Upon receiving the N2 request message, the RAN may identify that the UE having the sync accuracy requirement is in the corresponding cell and turn on the RAN sync function. As a UE may have multiple PDU sessions, when there is at least one PDU session having the sync accuracy requirement, the UE may be classified as a UE requesting the sync accuracy. Accordingly, information about a plurality of sync on PDU sessions (requesting the sync accuracy) for a single UE may be sent to the RAN, so the operation of the AMF determining whether it is the first sync on PDU session will be omitted in an embodiment of the disclosure.

In operation a.6, the RAN may send the UE a response to the session establishment request.

Referring to FIG. 5B, for a PDU session already set up, a sync activation/deactivation request may be sent to the 5GS from the AF/NEF along with the sync accuracy requirement. In operation b.0, the AF/NEF may forward the requirement using the session with the established PCF, and the PCF may forward the content to the SMF previously associated with the PCF. In this process, the AF/NEF may store the content in the UDR.

In operation b.1, the SMF may use a Nsmf_PDUSession-_SMContextStatusNotify to send the sync activation/deactivation request to the AMF along with the accuracy requirement. In operation b.2, the AMF may send the content of the sync activation/deactivation request to the RAN in an N2 request. In this case, the AMF may only send the first activation request or the last deactivation request of the UE to the RAN, thereby reducing the processing burden of the RAN.

Upon receiving the request, the RAN may turn on or off the RAN sync function to support the sync accuracy requirement. Specifically, when there are one or more UEs supporting synchronization in the corresponding cell after the RAN activates or deactivates the sync function for the corresponding UE, the RAN may increase the RRC/SIB transfer frequency for time information delivery as much as to satisfy the accuracy (RAN sync on). When there is no UE supporting synchronization in the corresponding cell after the RAN activates or deactivates the sync function for the corresponding UE, the RAN may decrease the RRC/SIB transfer frequency for time information delivery as much as not to satisfy the accuracy (RAN sync off). When required, the RAN may update configurations for the UE, in operation b.3.

When a PDU session with the sync indication turned on is released, the RAN may check again whether there is a UE requesting the sync function having the corresponding accuracy requirement in the corresponding cell, and turn off (deactivate) the RAN sync function when there is no UE requesting the sync function with the corresponding accuracy in the cell of the corresponding gNB, thereby enabling efficient use of resources.

Referring to FIG. 5C, the UE may send a PDU session release request including sync indication to the RAN in operation c1.1 to release the PDU session. In another embodiment of the disclosure, as the context for the PDU session is stored in the SMF, the sync indication may be omitted.

In operation c1.2, upon receiving the PDU session release request, the RAN may forward the session release request to the AMF in an N2 message. In operation c1.3, the AMF may in turn forward the PDU session release request to the SMF in a Nsmf_PDUSession_UpdateSMContext request message.

Upon receiving the Nsmf_PDUSession_UpdateSMContext request message, the SMF may perform a procedure required for the PDU session release with the PCF or the AF, and may request the AMF to send corresponding content to the BS and the UE in a Nsmf_PDUSession_UpdateSMContext response message in operation c1.4. In this case, the AMF may determine whether the PDU session is the last PDU session having the sync indication for the correspond-ing UE, and when a result of the determining is positive, may request the release of synchronization support having the corresponding accuracy requirement for the UE by sending an N2 resource release request including the sync indication and accuracy requirement to the RAN that has transmitted the N2 message in operation c1.5.

Upon receiving the sync support release request, the RAN may classify the corresponding UE as a UE not requesting the sync function having the corresponding accuracy requirement, determine whether there is a UE requesting the sync function in the corresponding cell, and turn off (deac-tivate) the RAN sync function when there is no UE request-ing the synchronization with the accuracy requirement in the cell of the corresponding gNB, thereby enabling efficient use of resources. Subsequently, the RAN may send a result of processing the PDU session release to the UE and release RAN resources in operation c1.6. In operation c1.7, the RAN may notify the AMF that the PDU session release has been completed in an N2 resource release response.

The PDU session release may be triggered by the UE or the network. In either case, the AMF may determine whether the PDU session is the last PDU session with sync on for the UE, and when a result of the determining is positive, may forward the sync support release request to the RAN that has transmitted the N2 message in operation c1.5. After the RAN classifies the UE as one not supporting synchroniza-tion, the RAN may check whether there is a UE requesting the sync function having the corresponding accuracy requirement in the corresponding cell, and turn off (deacti-vate) the RAN sync function when there is no UE requesting synchronization in the cell of the corresponding gNB, thereby enabling efficient use of resources.

To deregister the UE, the PDU session needs to be released first as a rule, but when the UE is deregistered first without the release of the PDU session for any reason, in operation c2, the RAN may exclude the UE, determine whether there is a UE requesting the sync function having the accuracy requirement in the corresponding cell, and turn off (deactivate) the RAN sync function when there is no UE requesting the synchronization having the accuracy require-ment in the cell of the corresponding gNB, thereby enabling efficient use of resources. In this case, the UE and the 3GPP network may be operated as in operation c and associated descriptions of FIG. 3.

Figure 6A:
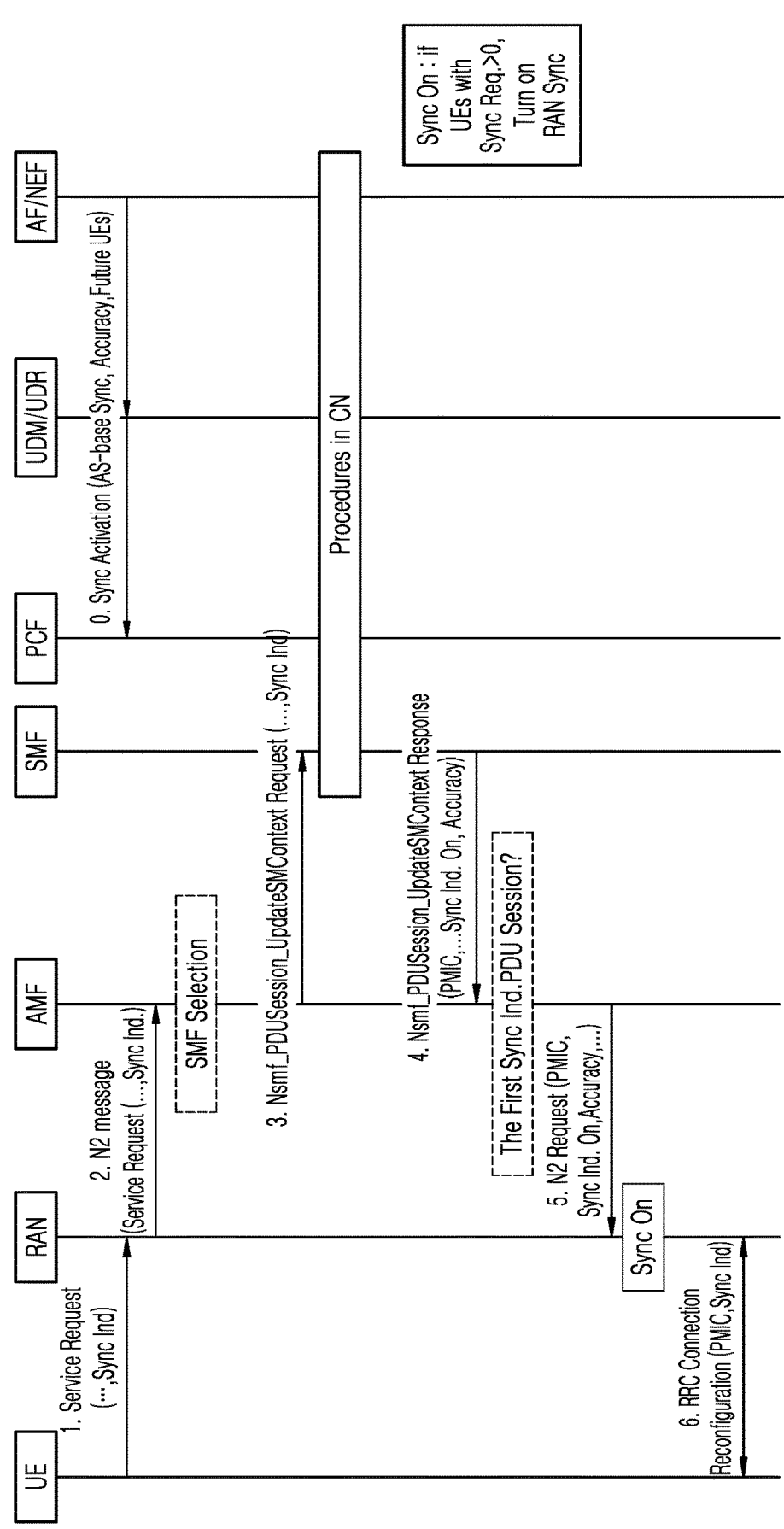
FIG. 6A is a diagram for illustrating a procedure for controlling a RAN sync function and delivering a port management information container (PMIC) in PDU session establishment according to an embodiment of the disclosure.
Figure 6B:
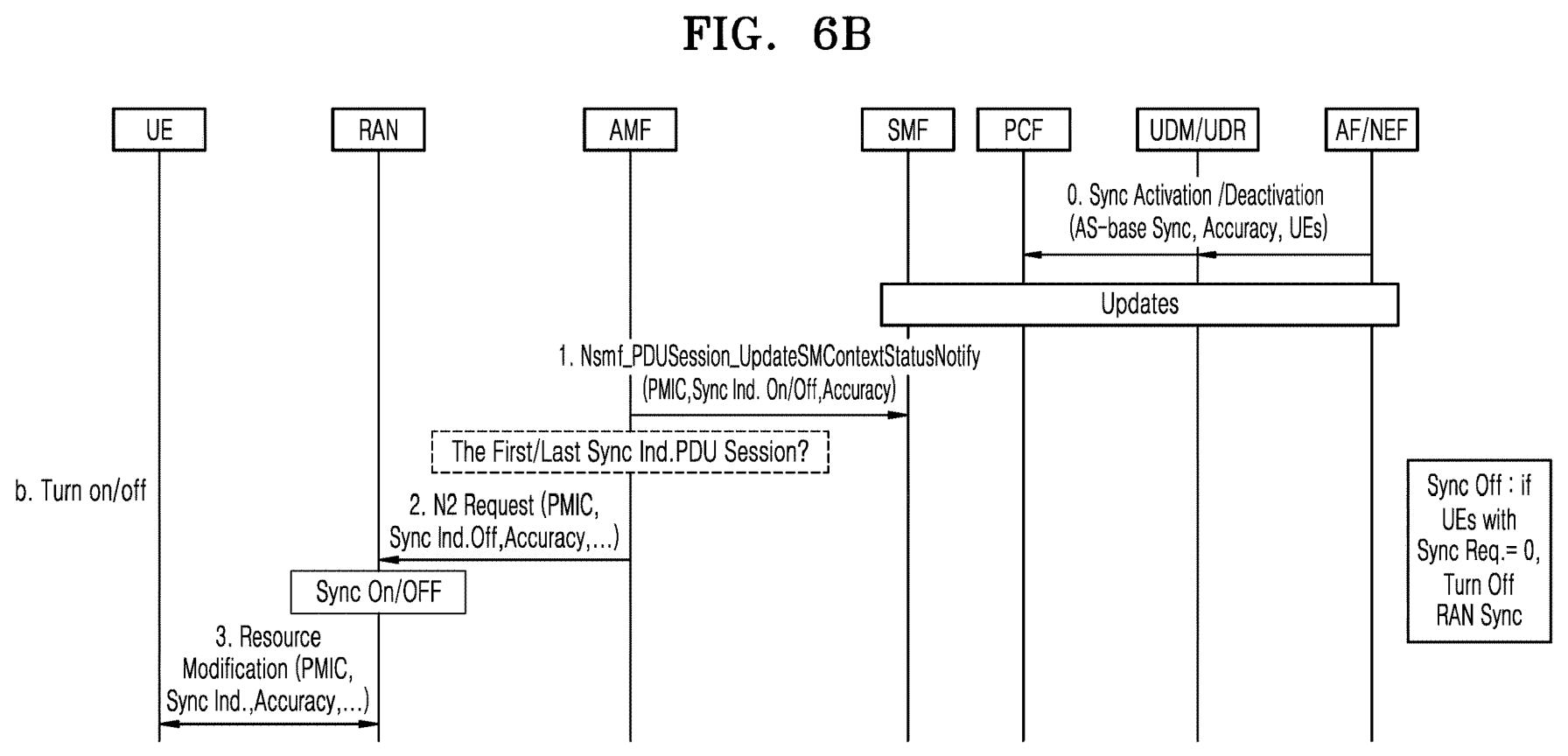
Figure 6C:
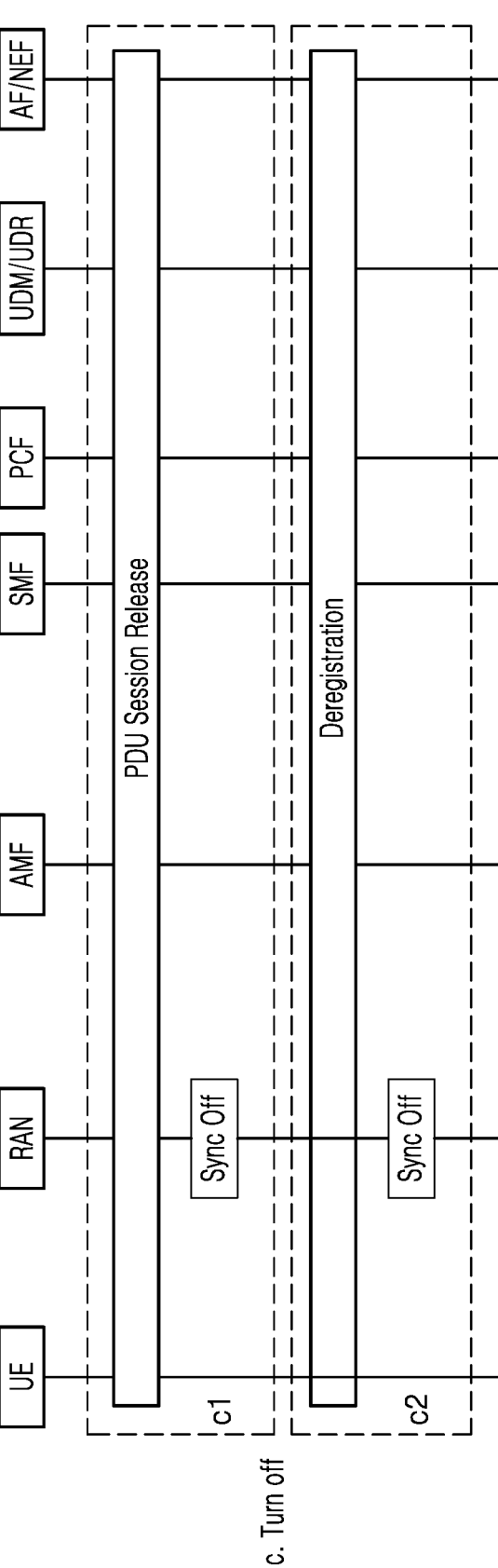
FIG. 6C is a diagram for illustrating a procedure for deactivating a RAN sync function when a PDU session is released or when a UE is deregistered according to an embodiment of the disclosure.

FIGS. 6A, 6B, and 6C are diagrams for illustrating a procedure for controlling a RAN sync function in sending a port management information container (PMIC) in method proposal 2-2 according to various embodiments of the disclosure.

Referring to FIG. 6A, in the 3GPP 5G network as shown in FIG. 2, sync activation for a future PDU session may be sent to the 5GS through the AF/NEF, in operation a.0. In this case, what is sent may be stored in the UDR.

In operation a.1, the UE may send a PDU session estab-lishment request message of a service request with sync indication contained therein to the RAN. In operation a.2, the RAN may send the service request to the AMF in an N2 message.

The AMF may in turn forward the received service request to SMF, in which case the AMF may select the SMF that supports the TSN sync function from among SMFs. In operation a.3, the AMF may forward the PDU session establishment request including the sync indication to the SMF in a Nsmf_PDUSession_UpdateSMContext request message.

Upon receiving the PDU session establishment request message, the SMF may perform a procedure required for PDU session establishment, which may include a process of confirming whether the UE has authority to create a PDU session having the TSN sync function. Furthermore, the SMF forms association with PCF, and in this process, the PCF sets up a session required with AF/NEF based on information recorded in the UDR. The PCF may receive all sync activation request information from the UDR, or may receive a corresponding sync activation request from the AF/NEF with which association is newly formed.

Subsequently, the PCF may forward the sync activation request to the SMF with which association is formed. In this case, the AF or the NEF may update configuration informa-tion of device-side time-sensitive networking (TSN) trans-lator (DS-TT) through a PMIC. The AF/NEF may send the PMIC and accuracy information to the PCF, which may in turn forward them to the SMF.

In operation a.4, the SMF may send the AMF a Nsmf_P-DUSession_UpdateSMContext response to ask to send the sync indication and accuracy requirement to the RAN and ask to send a response to the PDU session establishment request and the PMIC to the UE.

In an embodiment of the disclosure, the AMF may deter-mine whether a PDU session establishment response to be sent is for the first sync on PDU session of the UE, and send the RAN the sync indication and accuracy requirement when it is determined that it is the first sync on PDU session. The AMF may send the sync indication and accuracy require-ment to the RAN in an N2 request message, in operation a.5. Upon receiving the N2 request message, the RAN may identify that the UE having the sync accuracy requirement is in the corresponding cell and turn on the RAN sync function. As the UE may have multiple PDU sessions, when there is at least one PDU session having the sync accuracy require-ment, the UE may be classified as a UE requesting the sync accuracy. Accordingly, information about a plurality of sync on PDU sessions (requesting the sync accuracy support) for a single UE may be sent to the RAN, so the operation of the AMF determining whether it is the first sync on PDU session will be omitted in an embodiment of the disclosure.

In operation a.6, the RAN may send the UE a response to the session establishment request along with the PMIC.

Referring to FIG. 6B, for a PDU session having a PMIC delivery path already completed, a sync activation/deacti-vation request may be sent to the 5GS through the AF/NEF along with an accuracy requirement, in operation b.0. The AF/NEF may forward the PMIC and simultaneously, the accuracy requirement to the PCF in the previously estab-lished session. The PCF may deliver the PMIC, sync on/off indication and accuracy requirement through an SMF with which association is formed previously.

In operation b.1, the SMF may use a Nsmf_PDUSession_SMContextStatusNotify message to send the PMIC and the sync activation/deactivation request to the AMF along with the accuracy requirement. In operation b.2, the AMF may forward the PMIC and the content of the sync activation/deactivation request to the RAN in an N2 request. In this case, the AMF may only send the first activation request or the last deactivation request of the UE to the RAN, thereby reducing the processing burden of the RAN.

Upon receiving the request, the RAN may turn on or off the RAN sync function to support the sync accuracy require-ment. Specifically, when there are one or more UEs sup-porting synchronization in the corresponding cell after the RAN activates or deactivates the sync function for the corresponding UE, the RAN may increase the RRC/SIB transfer frequency for time information delivery as much as to satisfy the accuracy (RAN sync on). When there is no UE supporting synchronization in the corresponding cell after the RAN activates or deactivates the sync function for the corresponding UE, the RAN may decrease the RRC/SIB transfer frequency for time information delivery as much as not to satisfy the accuracy (RAN sync off). In operation b.3, the RAN may update the PMIC and the sync accuracy for the UE.

Referring to FIG. 6C, when a PDU session with the sync indication turned on is released, in operation c1, the RAN may check again whether there is a UE requesting the sync function having the corresponding accuracy requirement in the corresponding cell, and turn off (deactivate) the RAN sync function when there is no UE requesting synchroniza- tion with the corresponding accuracy in the cell of the corresponding gNB, thereby enabling efficient use of resources. In this case, the UE and the 3GPP network may be operated as in operation c1 and associated description of FIGS. 5A, 5B, and 5C.

To deregister the UE, the PDU session needs to be released first as a rule, but when the UE is deregistered first without the release of the PDU session for any reason, in operation c2, the RAN may exclude the UE, determine whether there is a UE requesting the sync function having the accuracy requirement in the corresponding cell, and turn off (deactivate) the RAN sync function when there is no UE requesting the synchronization having the accuracy require- ment in the cell of the corresponding gNB, thereby enabling efficient use of resources. In this case, the UE and the 3GPP network may be operated as in operation c and associated description of FIG. 3.

Figure 7A:
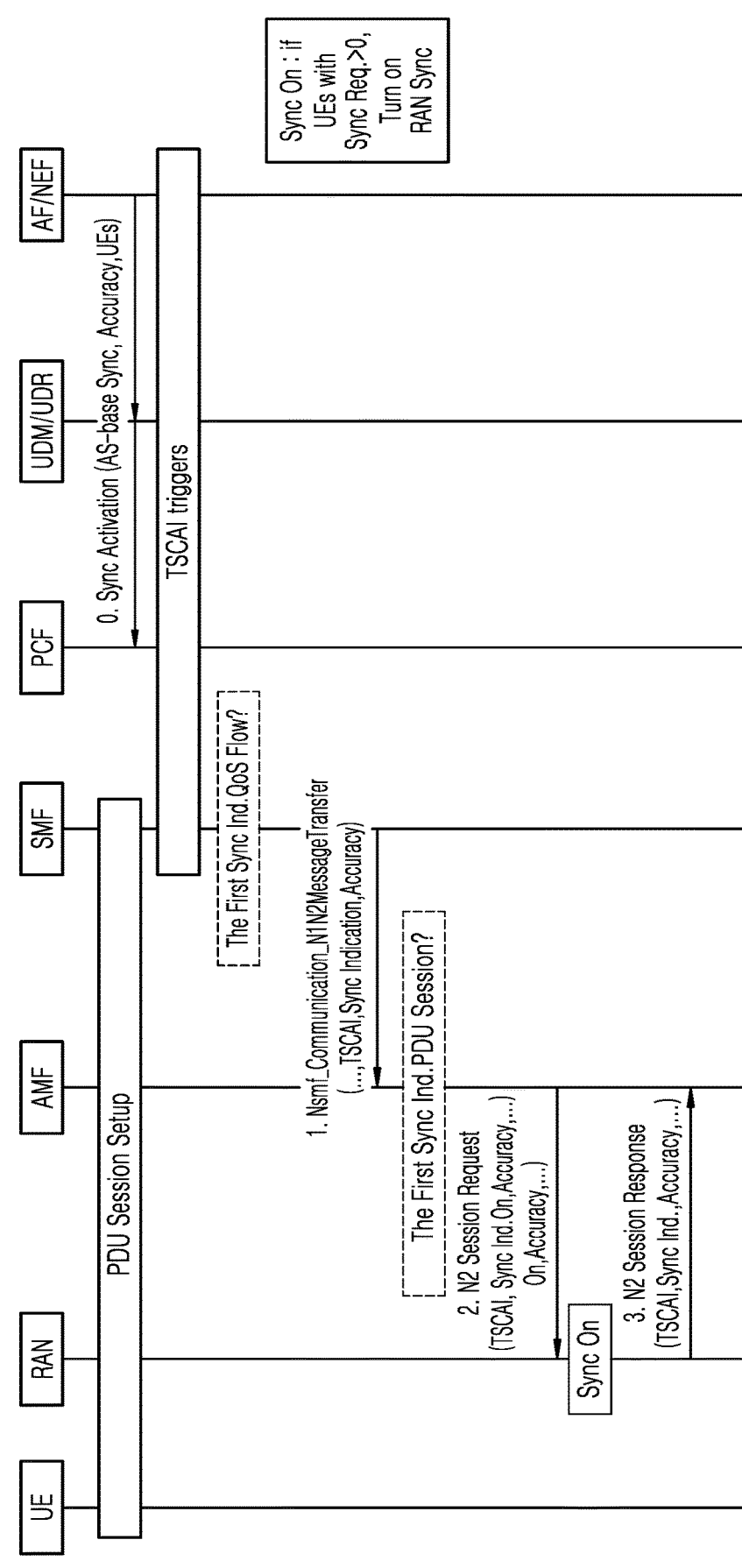
FIG. 7A is a diagram for illustrating a procedure for the configuration of quality of service (QoS) for time-sensitive communication (TSC) traffic flows according to an embodiment of the disclosure.
Figure 7B:
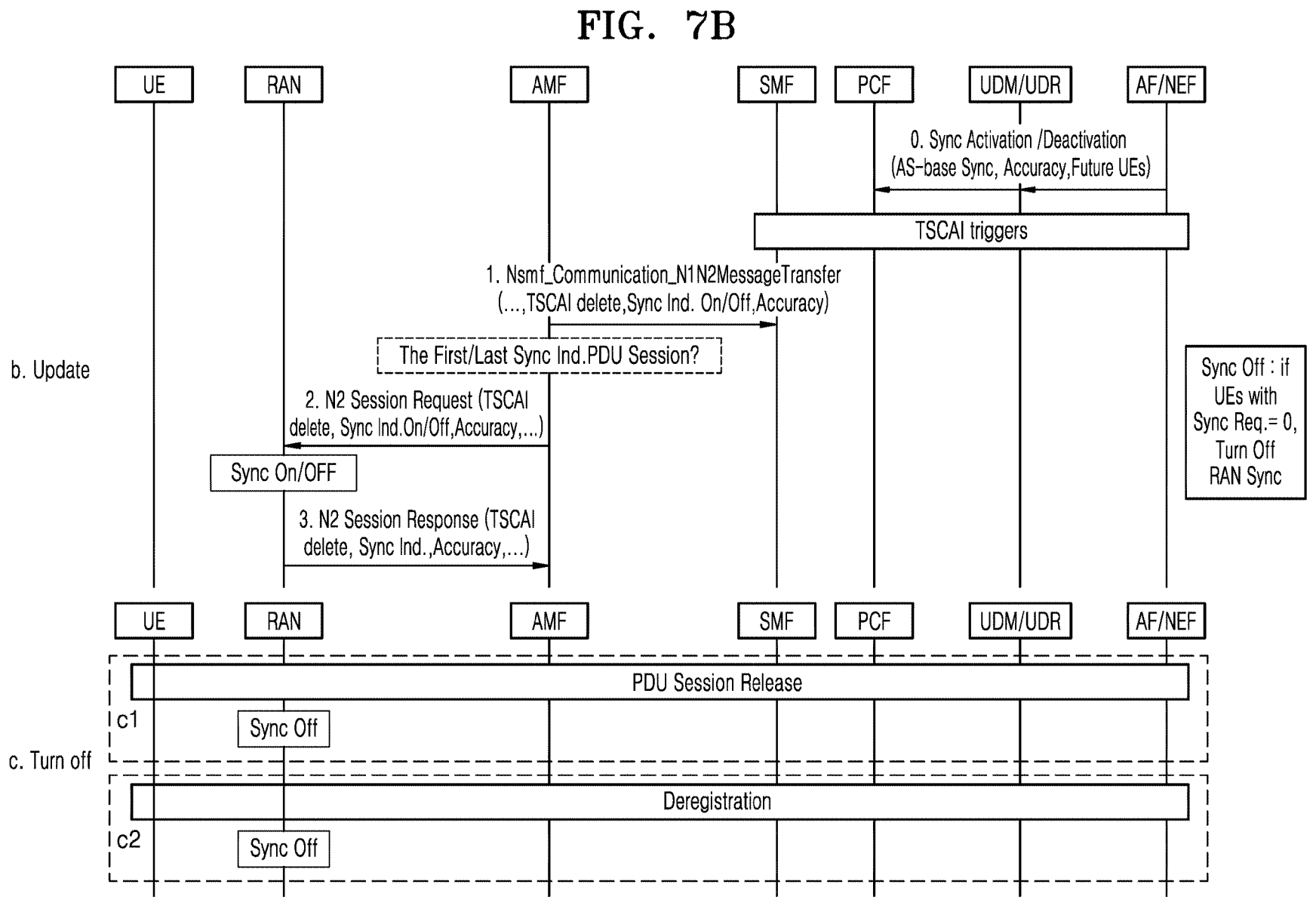

FIGS. 7A and 7B are diagrams for illustrating a procedure for controlling a RAN sync function in sending a time sensitive communication assistance information (TSCAI) in method proposal 2-3 according to various embodiments of the disclosure.

Referring to FIG. 7A, in the 3GPP 5G network configured as shown in FIG. 2, a QoS configuration procedure of a traffic flow for time sensitive communication (TSC) may be performed. TSN may collect information of a TSC traffic flow and send it to each TSN node in management infor- mation as in a centralized network configuration (CNC) server. The 3GPP network obtains TSC traffic flow infor- mation by exchanging the management information between the TSN AF of FIG. 2 and the CNC. A TSN AF that has obtained the TSC traffic flow information from the CNC forwards the traffic flow information to the PCF, which creates information to configure 3GPP QoS for the flow by mapping the traffic flow information to QoS information used in the 3GPP network and sends the SMF information such as periodicity of traffic burst and a TSN GM clock based arrival time for the TSC traffic flow. The arrival time represents a time when the traffic burst reaches the UPF in the downlink or the UE in the uplink. The SMF modifies the arrival time among the received information as a time to reach the gNB in the downlink and a time to leave the UE in the uplink, and creates the TSCAI by converting the modified value and periodicity from on a TSN GM clock basis to on a 5G GM clock basis. The SMF sends the TSCAI to the RAN by performing PDU session modification and using a QoS configuration process.

In a case that an ordinary AF instead of the TSN AF sends a sync activation request, the NEF may extract TSCAI information from the AF's request, process the information into TSCAI input information, and send the TSCAI infor- mation to the PCF along with a sync accuracy requirement.

In operation a.1, the SMF may send the TSCAI, sync indication, and accuracy requirement to the AMF in a Namf_Communication_N1N2MessageTransfer message.

In operation a.2, the AMF may send the TSCAI, sync indication, and accuracy requirement to the RAN in an N2 session request. Upon receiving the N2 session request, the RAN may classify the UE as a UE requesting a sync function having the accuracy requirement, and turn on the RAN sync function when the UE has not supported the RAN sync function. In the meantime, a UE may have multiple PDU sessions, and one PDU session may have multiple QoS flows. When there is at least one QoS flow having the TSCAI, the corresponding UE may be classified as a UE requesting synchronization having the accuracy require- ment. Accordingly, in an embodiment of the disclosure, before operation a.1, the SMF determines whether the QoS flow is a first sync on flow of the corresponding PDU session, or before operation a.2, the AMF determines whether the PDU session is the first PDU session with the UE having a sync on QoS flow, and the SMF or the AMF may send a sync request to the RAN when a result of the determining is positive. In another embodiment of the dis- closure, TSCAI needs to be sent in any case, so that the determination process may be omitted.

In operation a.3, the RAN may not send the UE the QoS parameter through session modification but may send an N2 session response directly to the AMF.

Referring to FIG. 7B, the QoS modification may be triggered not only by the CNC but also by another network entity or UE, and when the SMF determines that the corresponding PDU session no longer supports the sync function having the TSCAI or accuracy requirement accord- ing to the QoS modification, the SMF may send the AMF a Namf_Communication_N1N2MessageTransfer message including TSCAI update, sync indication and accuracy requirement according to the QoS modification of the cor- responding PDU session, in operation b.1. In operation b.2, the AMF may forward the TSCAI update, sync indication, and accuracy requirement to the RAN in an N2 session request. Upon receiving the N2 session request, the RAN may classify the corresponding UE as one not requesting the sync function having the accuracy requirement, determine whether there is a UE requesting the sync function having the corresponding accuracy requirement in the correspond- ing cell, and turn off (deactivate) the RAN sync function when there is no UE requesting the synchronization with the accuracy requirement in the cell of the corresponding gNB, thereby enabling efficient use of resources In operation b.3, the RAN may send an N2 session response to the AMF.

As a QoS configuration is gone when the PDU session is released without releasing the QoS, in operation c1, the RAN may check again whether there is a UE requesting the sync function having the corresponding accuracy require- ment in the corresponding cell, and turn off (deactivate) the RAN sync function when there is no UE requesting syn- chronization with the corresponding accuracy requirement in the cell of the corresponding gNB, thereby enabling efficient use of resources. In this case, the UE and the 3GPP network may be operated as in operation c1 and associated description of FIGS. 5A, 5B, and 5C.

As the corresponding PDU session is released and the corresponding QoS configuration is gone when the UE is deregistered, in operation c2, even in this deregistration procedure, the RAN may check again whether there is a UE requesting the sync function having the corresponding accu- racy requirement in the corresponding cell, and turn off (deactivate) the RAN sync function when there is no UE requesting synchronization with the corresponding accuracy requirement in the cell of the corresponding gNB, thereby enabling efficient use of resources. In this case, the UE and the 3GPP network may be operated as in operation c and associated description of FIG. 3.

Figure 8:
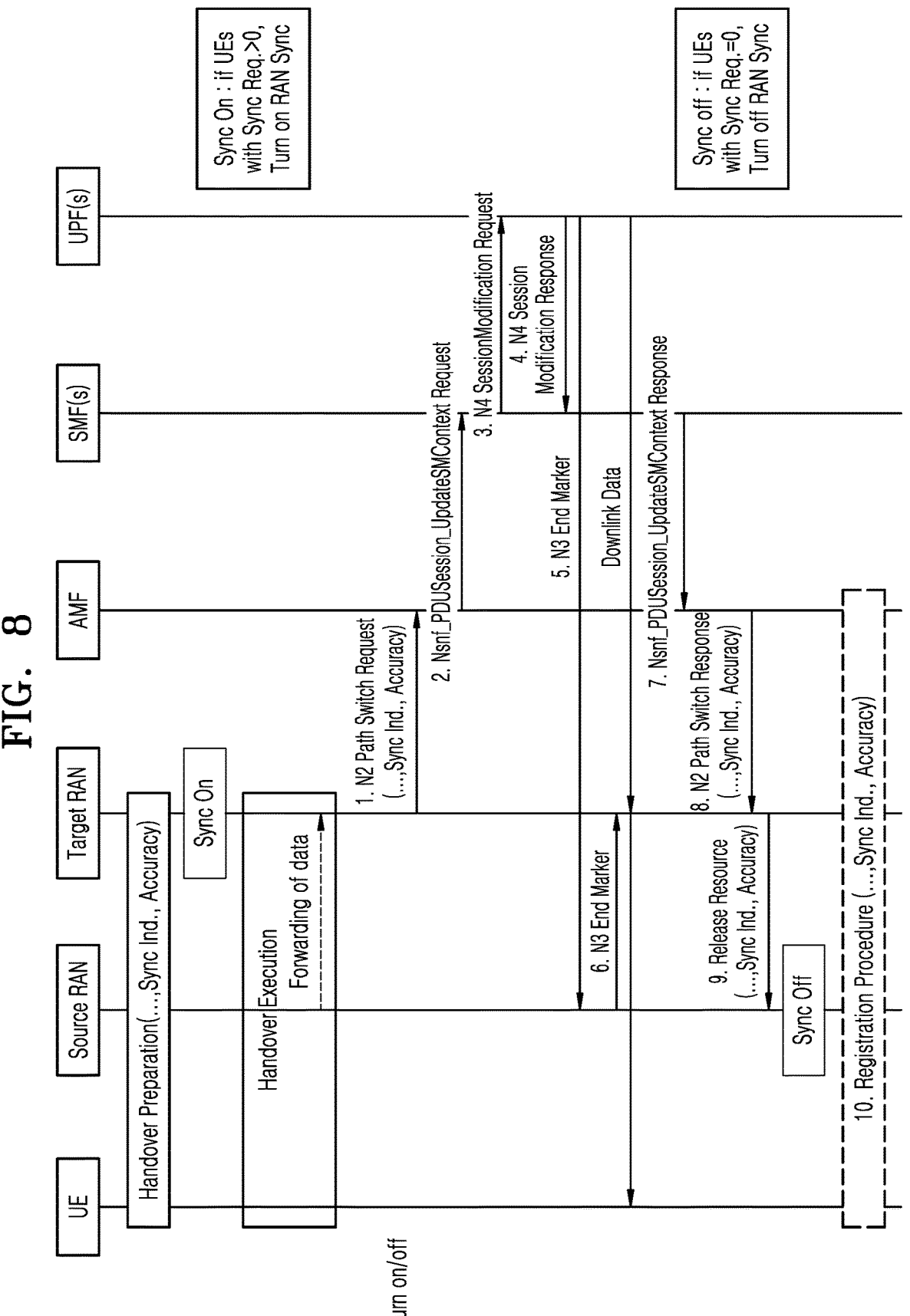
FIG. 8 is a diagram for illustrating a procedure for controlling a RAN sync function during handover according to an embodiment of the disclosure.

FIG. 8 is a diagram for illustrating a procedure for controlling a RAN sync function for handover, which may be applied to both the method proposal 1 and the method proposal 2 according to an embodiment of the disclosure.

During handover, the UE may transfer sync related functions of a source RAN and a target RAN. Specifically, a handover procedure may be used such that the source RAN has one less UE having the sync accuracy requirement and the target RAN has one more UE having the sync accuracy requirement.

Referring to FIG. 8, prior to operation a.1, in a handover preparation process, sync accuracy for the UE may be applied to the target RAN through Xn signaling between the source RAN and the target RAN. After a user plane data transfer path is completed with Xn through a handover execution process, a sync request may also be sent to the AMF in an N2 path switch request, in operation a.1.

In operation a.2, the AMF may send sync accuracy to the SMF in a Nsmf_PDUSession_UpdateSMContext request. In this case, as for the method proposal 1, the sync accuracy may not be included. In operations a.3 and a.4, the SMF performs N4 session modification, and as a result, in operations a.5 and a.6, the user traffic path is changed from the UPF to the target RAN.

In operation a.7, the SMF sends the sync accuracy to the AMF in a Nsmf_PDUSession_UpdateSMContext response. In operation a.8, the AMF sends the sync accuracy to the target RAN in an N2 path switch response.

The target RAN determines whether the RAN sync is turned on to suit the sync accuracy. In operation a.9, the target RAN requests the source RAN to release the resource and simultaneously, sends the sync accuracy requirement as well. The source RAN performs RAN sync off as the resource for the UE for the sync accuracy is released. Specifically, when there is no UE requesting synchronization having the corresponding accuracy requirement in the cell of the corresponding gNB, the source RAN may turn off (deactivate) the RAN sync function, thereby enabling efficient use of resources. In operation a.10, the registration procedure for the UE is performed.

Methods according to the claims of the disclosure or the embodiments of the disclosure described in the specification may be implemented in hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs may include instructions that cause the electronic device to perform the methods in accordance with the claims of the disclosure or the embodiments described in the specification.

The programs (software modules, software) may be stored in a random access memory (RAM), a non-volatile memory including a flash memory, a read only memory (ROM), an electrically erasable programmable ROM (EE-PROM), a magnetic disc storage device, a compact disc-ROM (CD-ROM), a digital versatile disc (DVD) or other types of optical storage device, and/or a magnetic cassette.

Alternatively, the programs may be stored in a memory including a combination of some or all of them. There may be a plurality of memories.

The program may also be stored in an attachable storage device that may be accessed over a communication network including the Internet, an intranet, a local area network (LAN), a wide LAN (WLAN), or a storage area network (SAN), or a combination thereof. The storage device may be connected to an apparatus performing the embodiments of the disclosure through an external port. In addition, a separate storage device in the communication network may be connected to the apparatus performing the embodiments of the disclosure.

According to various embodiments of the disclosure, the UE connected to a 3GPP network sends a requirement for supporting TSN synchronization to the network to support the requirement by increasing the sync information delivery cycle and activating individual delivery of the RAN, and to increase RAN operation efficiency by decreasing the sync information delivery cycle and deactivating individual delivery of the RAN, when the requirement is not necessary.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a base station (BS) supporting time synchronization service for a terminal in a wireless communication system, the method comprising:

receiving at least one synchronization parameter for controlling time synchronization service of the BS from Access and Mobility Function (AMF) based on subscription information of the terminal identified by the AMF during a registration procedure, wherein the at least one synchronization parameter comprises a synchronization indicator indicating whether to activate or deactivate the time synchronization service and a synchronization accuracy required to the time synchronization service, and wherein the time synchronization service comprises a service to provide time information to the terminal by using an interface between the BS and the terminal;

activating or deactivating the time synchronization service of the BS, based on the synchronization indicator; and providing time information to the terminal based on the synchronization accuracy.

2. The method of the claim 1, wherein the interface between the BS and the terminal is a 5G interface between the BS and the terminal.

3. The method of the claim 1, wherein the synchronization accuracy indicates allowable time synchronization error for the time synchronization service.

4. The method of the claim 1, wherein the at least one synchronization parameter is included in a request message transmitted from Application Function (AF).

5. The method of the claim 4, wherein the request message includes information about at least one target terminal requiring the time synchronization service.

6. The method of the claim 1, wherein the at least one synchronization parameter is provided to the BS via Policy Control Function (PCF).

7. A base station (BS) supporting time synchronization service for a terminal in a wireless communication system, the BS comprising:

a transceiver; and at least one processor coupled to the transceiver and configured to:

receive at least one synchronization parameter for controlling time synchronization service of the BS from Access and Mobility Function (AMF) based on subscription information of the terminal identified by the AMF during a registration procedure, wherein the at least one synchronization parameter comprises a synchronization indicator indicating whether to activate or deactivate the time synchronization service and a synchronization accuracy required to the time synchronization service, and wherein the time synchronization service comprises a service to provide time information to the terminal by using an interface between the BS and the terminal, activate or deactivate the time synchronization service of the BS, based on the synchronization indicator, and provide time information to the terminal based on the synchronization accuracy.

8. The BS of the claim 7, wherein the interface between the BS and the terminal is a 5G interface between the BS and the terminal.

9. The BS of the claim 7, wherein the synchronization accuracy indicates allowable time synchronization error for the time synchronization service.

10. The BS of the claim 7, wherein the at least one synchronization parameter is included in a request message transmitted from Application Function (AF).

11. The BS of the claim 10, wherein the request message includes information about at least one target terminal requiring the time synchronization service.

12. The BS of the claim 7, wherein the at least one synchronization parameter is provided to the BS via Policy Control Function (PCF).

* * * * *